United States Patent
Fujinaga (10) Patent No.: US 10,432,811 B2
(45) Date of Patent: Oct. 1, 2019

(54) IMAGE READING METHOD WITH DOCUMENT LAYOUT DETECTION, AND IMAGE READING APPARATUS AND STORAGE MEDIUM THEREWITH

(71) Applicant: CANON KABUSHIKI KAISHA, Tokyo (JP)

(72) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 15/811,373

(22) Filed: Nov. 13, 2017

(65) Prior Publication Data

US 2018/0146106 A1 May 24, 2018

(30) Foreign Application Priority Data

Nov. 18, 2016 (JP) ................. 2016-225342

(51) Int. Cl.
*G06F 3/12* (2006.01)
*H04N 1/00* (2006.01)

(52) U.S. Cl.
CPC ..... *H04N 1/00708* (2013.01); *H04N 1/00737* (2013.01); *H04N 1/00748* (2013.01); *H04N 1/00758* (2013.01)

(58) Field of Classification Search
CPC ............. H04N 1/2166; H04N 1/00708; H04N 1/00681; H04N 1/2038; H04N 1/32101; H04N 1/10; H04N 2201/0422; H04N 2201/3243; H04N 2201/3274; H04N 2201/33321

USPC ................. 358/1.1–1.18, 403, 449, 474, 448
See application file for complete search history.

(56) References Cited

U.S. PATENT DOCUMENTS

| 7,133,165 | B2 | 11/2006 | Yamada et al. ............... 358/474 |
| 7,551,330 | B2 | 6/2009 | Yamada et al. ............... 358/474 |
| 2004/0190025 | A1* | 9/2004 | Nomura ............ H04N 1/00132 358/1.9 |
| 2010/0079791 | A1* | 4/2010 | Kim ................... H04N 1/00214 358/1.15 |
| 2010/0226559 | A1* | 9/2010 | Najari ..................... G06K 9/186 382/140 |
| 2014/0198350 | A1* | 7/2014 | Prabhu ................ H04N 1/2166 358/403 |

FOREIGN PATENT DOCUMENTS

JP 2013-211658 10/2013

* cited by examiner

*Primary Examiner* — Gabriel I Garcia
(74) *Attorney, Agent, or Firm* — Venable LLP (57) ABSTRACT

An image reading method has a first moving step, a first determining step and a second determining step. In the first moving step, the reading head moves to a detection position by a predetermined distance from a position, at which a first document is detected, while the reading head does not perform any reading processing. In the first determining step, the size and layout of the first document is determined based on the result of reading processing at the detection position. In the second determining step, whether or not a second document exists at the detection position is determined based on the result of the reading processing at the detection position, and then the size and layout of the second document is determined.

17 Claims, 9 Drawing Sheets

| DETECTED LENGTH | READING MOVEMENT DISTANCE | PRESUMABLE SIZE | PRESUMABLE LAYOUT |
|---|---|---|---|
| 55mm | 91mm | BUSINESS CARD | LATERAL |
| 91mm | 55mm | BUSINESS CARD | VERTICAL |
| 89mm | 127mm | L SIZE | LATERAL |
| 127mm | 89mm | L SIZE | VERTICAL |
| 102mm | 152mm | KG | LATERAL |
| 152mm | 102mm | KG | VERTICAL |
| 148mm | 210mm | A5 | LATERAL |
| 210mm | 148mm | A5 | VERTICAL |
| 105mm | 148mm | A6 | LATERAL |
| 148mm | 105mm | A6 | VERTICAL |

IMAGE READING METHOD WITH DOCUMENT LAYOUT DETECTION, AND IMAGE READING APPARATUS AND STORAGE MEDIUM THEREWITH

BACKGROUND OF THE INVENTION

Field of the Invention

The present invention relates to an image reading method, an image reading apparatus, and a storage medium.

Description of the Related Art

Japanese Patent Laid-Open No. 2013-211658 discloses a method for pre-scanning an image prior to an actual image reading operation so as to detect the existence, size, and layout of a document on a document table in an image reading apparatus such as a copying machine.

However, in the case of, for example, multi-cropping, when a plurality of documents are placed on a document table, it is difficult to accurately detect the size and layout of each of the plurality of documents by one pre-scanning even by using the prior art disclosed in Japanese Patent Laid-Open No. 2013-211658.

SUMMARY OF THE INVENTION

The present invention has been accomplished in order to solve the above-described problem. Therefore, its object is to accurately and efficiently detect the size and layout of each of a plurality of documents placed on a document table by pre-scanning.

According to a first aspect of the present invention, there is provided an image reading method for moving a reading head, in which a plurality of reading sensors are arranged in a first direction, along a document table in a second direction crossing the first direction, so as to read a plurality of documents placed on the document table, the image reading method comprising: a first moving step for moving the reading head in the second direction to a detection position by a predetermined distance from a position, at which a first document is detected, in a state in which the reading head does not perform any reading processing; a first determining step for determining the size and layout of the first document based on the result of reading processing by the reading head at the detection position; and a second determining step for determining whether or not a second document other than the first document exists at the detection position in the second direction and a position apart from the first document in the first direction based on the result of the reading processing by the reading head at the detection position, and determining the size and layout of the second document in a case where it is determined that the second document exists.

According to a second aspect of the present invention, there is provided an image reading apparatus for moving a reading head, in which a plurality of reading sensors are arranged in a first direction, along a document table in a second direction crossing the first direction, so as to read a plurality of documents placed on the document table, the image reading apparatus comprising: a first moving unit configured to move the reading head in the second direction to a detection position by a predetermined distance from a position, at which a first document is detected, in a state in which the reading head does not perform any reading processing; a first determining unit configured to determine the size and layout of the first document based on the result of reading processing by the reading head at the detection position; and a second determining unit configured to determine whether or not a second document other than the first document exists at the detection position in the second direction and a position apart from the first document in the first direction based on the result of the reading processing by the reading head at the detection position, and determine the size and layout of the second document in a case where it is determined that the second document exists.

According to a third aspect of the present invention, there is provided a non-transitory computer-readable storage medium that allows one or more processors to perform an image reading method for moving a reading head in which a plurality of reading sensors are arranged in a first direction, along a document table in a second direction crossing the first direction, so as to read a plurality of documents placed on the document table, the image reading method comprising: a first step for moving the reading head in the second direction to a detection position by a predetermined distance from a position, at which a first document is detected, in a state in which the reading head does not perform any reading processing; a first determining step for determining the size and layout of the first document based on the result of the reading processing by the reading head at the detection position; and a second determining step for determining whether or not a second document other than the first document exists at the detection position in the second direction and a position apart from the first document in the first direction based on the result of the reading processing by the reading head at the detection position, and determining the size and layout of the second document in a case where it is determined that the second document exists.

Further features of the present invention will become apparent from the following description of exemplary embodiments with reference to the attached drawings.

DESCRIPTION OF THE EMBODIMENTS

First Embodiment

Figure 1A:
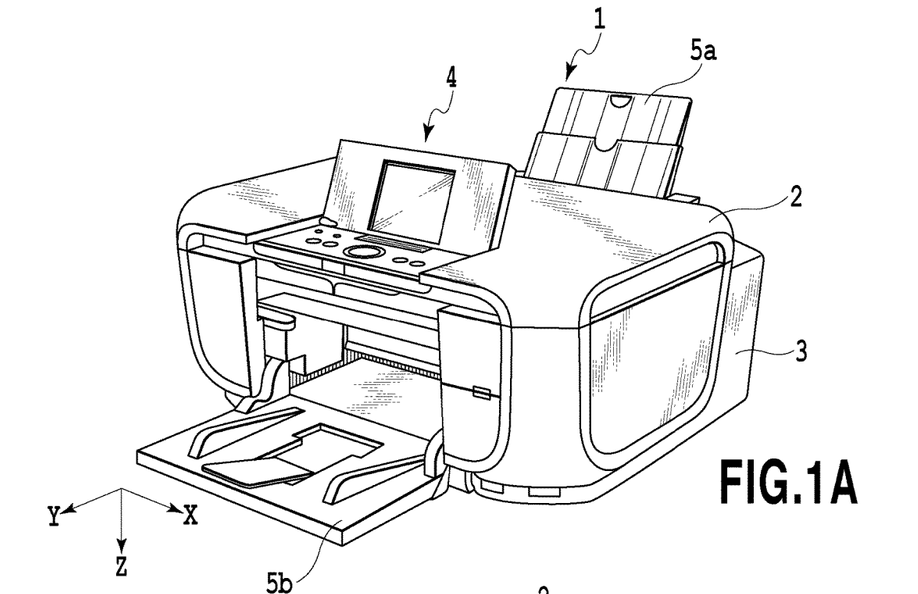
FIGS. 1A and 1B are perspective views showing the appearance of an image reading apparatus.
Figure 1B:
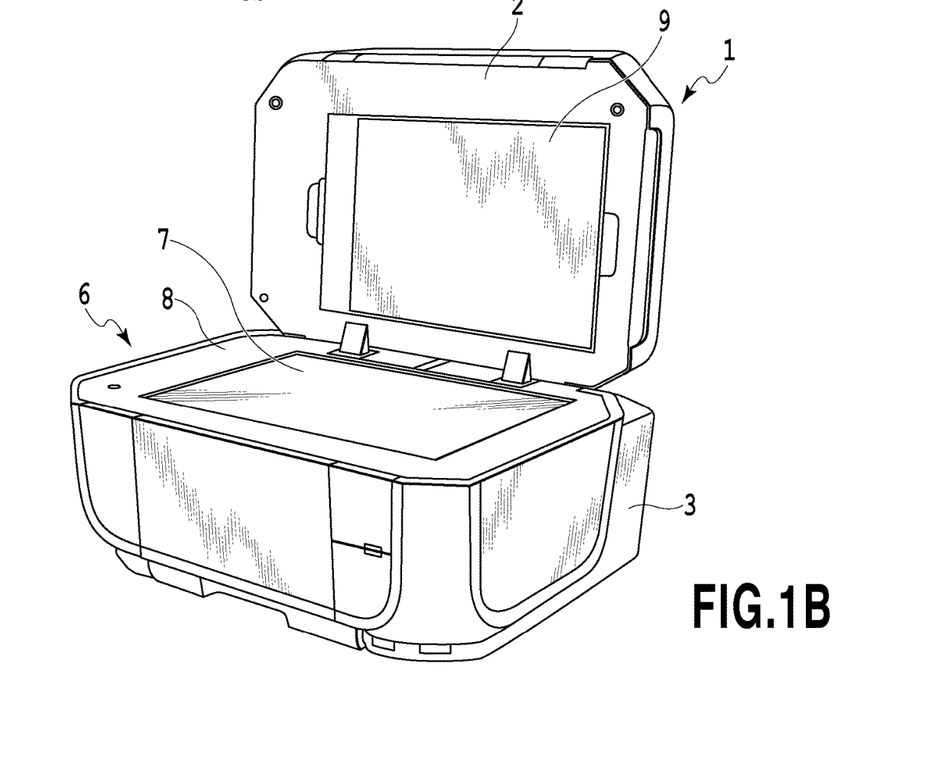

FIGS. 1A and 1B are perspective views showing the appearance of an image reading apparatus 1 that is used in the present embodiment. In the present embodiment, the image reading apparatus 1 is a multifunction machine equipped with a printing function in addition to a reading function, and therefore, it can function as a scanner, a printing unit, and a copying machine. The image reading apparatus 1 includes mainly a cover 2 and an apparatus body 3. The cover 2 is provided with an operation unit 4, on which information is presented to a user or a command is received from a user. FIG. 1A shows a state in which the cover 2 is closed with respect to the apparatus body 3: in contrast, FIG. 1B shows a state in which the cover 2 is opened.

Inside of the apparatus body 3 are housed a reading head for performing a reading operation, a print head for performing a printing operation, and principal constituent elements for controlling these various devices. With reference to FIG. 1A, when, for example, a printing operation is performed, a sheet stacked on a sheet feed tray 5b is fed into the apparatus body 3, in which a predetermined image is printed thereon, and then, is discharged onto a sheet discharge tray 5a.

In the case of a reading operation, a user once opens the cover 2, as shown in FIG. 1B, and then, places a document on a document table 6. The document table 6 includes a glass plate 7 and a frame 8 surrounding the glass plate 7. The user places the document with a side to be read facing the glass plate 7, and then, closes the cover 2. A flat plate 9 having a damper material such as sponge held thereat is provided at a portion of the cover 2 in contact with the document. When the cover 2 is closed, the side to be read of the document becomes flat owing to the weight of the cover 2. Documents having various sizes can be laid out on the document table 6.

Figure 2:
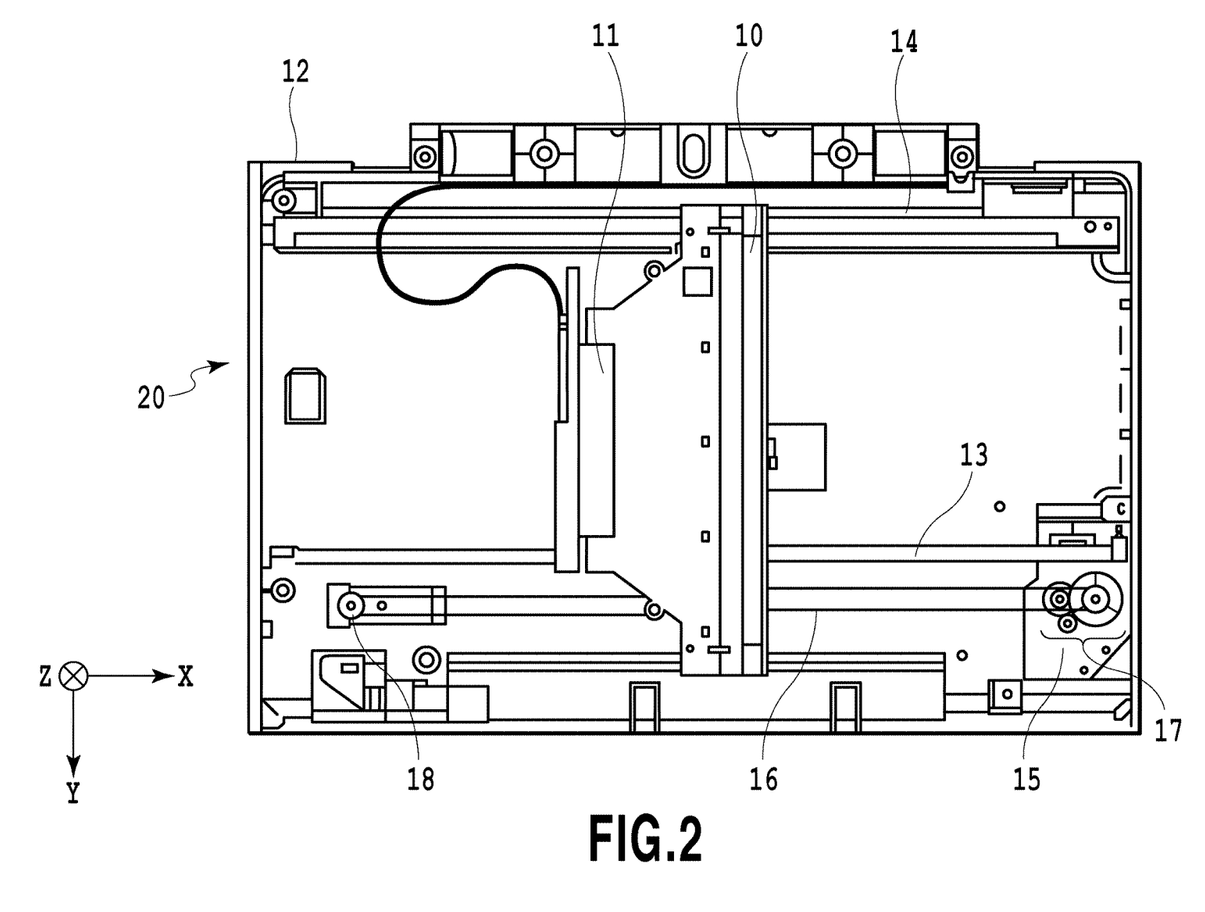
FIG. 2 is a view showing the configuration of a reading unit.

FIG. 2 is a view showing the configuration of a reading unit 20 disposed under the document table 6 (i.e., in a +Z direction) inside of the apparatus body 3. The reading unit 20 is configured by fixing various members to a scanner frame 12 serving as a casing. A carriage 11 having a reading head 10 mounted thereon is movable along the document table 6 in an X direction in FIG. 2 while being supported under the guidance of a guide shaft 13 and a guide rail 14 on both ends of the carriage 11 in a Y direction. The carriage 11 is moved by a CR motor 15 serving as a drive source whose drive force is transmitted via drive gears 17, a pulley 18, and a timing belt 16 stretched therebetween.

A plurality of reading elements (i.e., reading sensors) including CCDs are arranged in a direction crossing the movement direction (i.e., the Y direction) in the reading head 10. An image can be read at a resolution equivalent to an arrangement pitch of the reading elements in the Y direction. In contrast, in the X direction, the reading resolution can be adjusted according to the movement speed of the carriage 11 and the reading cycle of each of the reading elements.

Figure 3:
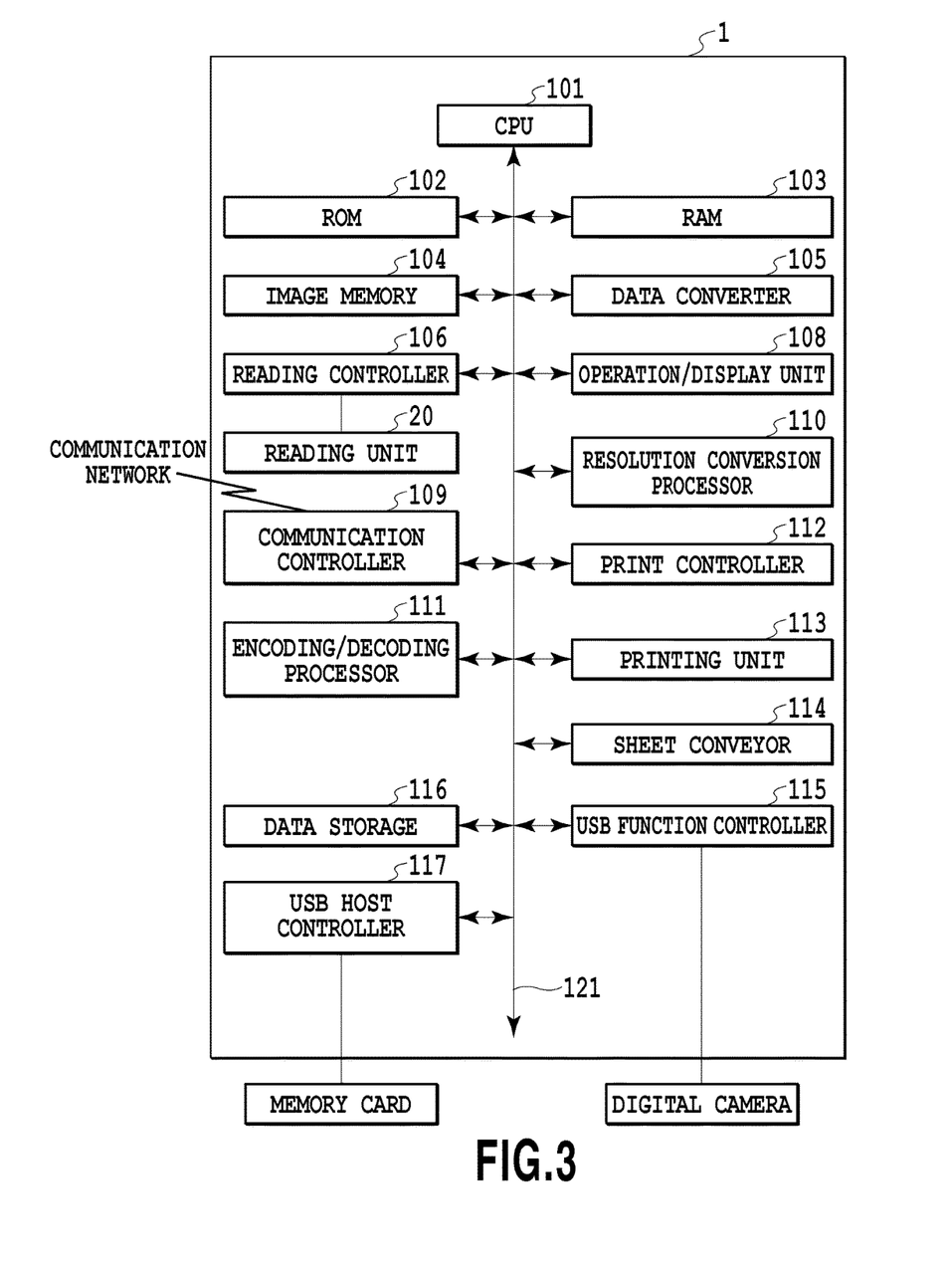
FIG. 3 is a block diagram illustrating the control system of the image reading apparatus.

FIG. 3 is a block diagram illustrating the control system of the image reading apparatus 1. A CPU 101 is adapted to control the entire image reading apparatus 1. Furthermore, the CPU 101 executes steps of flowcharts illustrated in FIGS. 4, 5, 7, and 9, described later, in accordance with programs stored in a ROM 102 while using a RAM 103 as a work area.

The ROM 102 stores therein built-in operating system (OS) programs, parameters for use in various kinds of control, and the like in addition to control programs to be executed by the CPU 101. The CPU 101 performs software control such as scheduling or task switching in accordance with each of the control programs stored in the ROM 102 under the control of a built-in OS stored in the ROM 102.

The RAM 103 includes an SRAM (i.e., a static RAM) or the like, and is used as an area, in which set values registered by an operator, management data of the image reading apparatus 1, and the like are stored, as well as the work area for the CPU 101. An image memory 104 includes a DRAM (i.e., a dynamic RAM) or the like, and stores therein image data before, during, or after image processing. During the image processing, in which the CPU 101 subjects image data, the image memory 104, the RAM 103, and a data storage 116, described later, are used as work areas. A data converter 105 carries out image data conversion such as an analysis of a page description language (PDL) and development of character data by CG (i.e., computer graphics).

A reading controller 106 controls the reading unit 20 to read an image of a document placed on the document table 6. More specifically, the reading controller 106 drives the CR motor 15 so as to control the movement of the carriage 11 under the control of the CPU 101, or converts an analog signal detected by the reading head 10 during the movement into a digital signal so as to transfer the signal to the image memory 104.

An operation/display unit 108 includes various keys, an LED (abbreviating a light emitting diode), an LCD (abbreviating a liquid crystal display), and the like. The operation/display unit 108 is designed to receive a command that is input by a user or display the operational condition or status of the image reading apparatus 1. A communication controller 109 includes a MODEM (i.e., a modulator-demodulator), an NCU (i.e., a network control unit), or the like. In the present embodiment, the communication controller 109 is connected to an analog communication network (a PSTN abbreviating a public switched telephone network) 131, and thus, controls communications based on the T30 protocol or networks for calls to or from a communication network. A resolution conversion processor 110 performs scaling processing of image data in addition to millimeter-inch resolution conversion of image data. An encoding/decoding processor 111 performs encoding/decoding or scaling processing image data (MH, MR, MMR, JBIG, JPEG, or the like) handled by the image reading apparatus 1.

A print controller 112 subjects image data to be printed to various kinds of image processing such as smoothing, print density correcting, and color correcting, and thus, produces image data that can be printed by a printing unit 113. Moreover, the print controller 112 periodically checks the status of the printing unit 113, and then, provides the CPU 101 with obtained information. The printing unit 113 is a printing apparatus such as a laser beam printer or an ink jet printer, and prints an image on a sheet in accordance with the image data received from the print controller 112.

A sheet feeder/conveyor 114 is adapted to feed a sheet stacked on the sheet feed tray 5b into the apparatus to thus control the conveyance of the sheet being printed by the printing unit 113 and discharge the printed sheet onto the sheet discharge tray 5a, under the control of the print controller 112. The sheet feeder/conveyor 114 can vary conveyance paths or conveyance manners according to the type of sheet.

A USB function controller 115 performs protocol control in accordance with the USB communication standard. For example, the USB function controller 115 converts data from a USB control task to be carried out by the CPU 101 into a packet, and then, transmits a USB packet to an outside information processing terminal. To the contrary, the USB function controller 115 converts a USB packet from an information processing terminal connected to the outside such as a digital camera into data, and then, transmits it to the CPU 101.

The data storage 116 is used for backing up data having a relatively large capacity when data is transmitted to or received from an external device or image processing is performed. The data storage 116 may be used in the same manner as the image memory 104. Although a DRAM is preferably used as the data storage 116, a hard disk, a volatile memory, or the like may be used.

A USB host controller 117 is a controller that is adapted to make communications in accordance with a protocol defined by the USB communication standard. According to the USB communication standard, bi-directional data communications can be achieved at a high speed. Here, a plurality of hubs or functions (slaves) can be connected to one host (a master). Incidentally, the above-described mechanisms are mutually connected via a CPU bus 121 controlled by the CPU 101.

Figure 4:
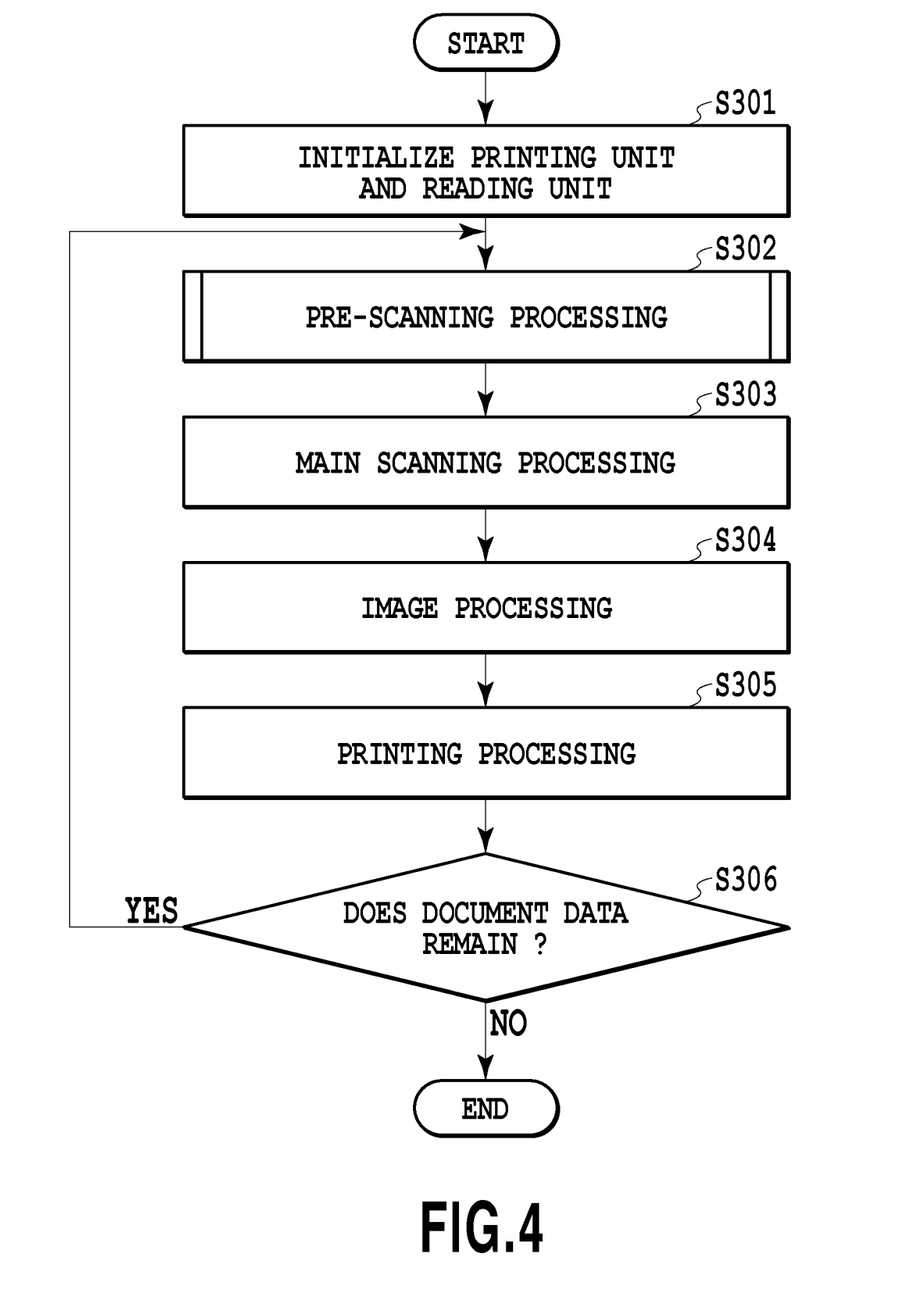
FIG. 4 is a flowchart illustrating processing in the case of a copying operation.

FIG. 4 is a flowchart illustrating processing to be performed by the CPU 101 when the image reading apparatus 1 performs a copying operation. This processing is started at a timing at which a user inputs a copy command via the operation unit 4 or a personal computer (abbreviated as a PC) connected to the outside inputs a copy command, and thus, the CPU 101 performs the processing in accordance with the program stored in the ROM 102.

Once the present processing is started, the CPU 101 first initializes the printing unit 113 and the reading unit 20 in step S301. More specifically, the CPU 101 returns the reading head 10 to its home position or erases the image data stored for the previous reading operation or writing operation from a memory region. Next, the CPU 101 performs pre-scanning processing in step S302. More specifically, the CPU 101 drives the CR motor 15 to move the carriage 11 at a relatively high speed while detecting the outline of the document placed on the document table 6 based on the detection result by the reading head 10. The CPU 101 can perform the pre-scanning processing so as to check the number of documents, the size and layout, and the like of each of the documents placed on the document table 6. The pre-scanning processing will be described later in detail.

After the CPU 101 checks the outline of the document by the pre-scanning processing in step S302, the CPU 101 proceeds to step S303, and then, performs main scanning processing based on the obtained information. More specifically, the CPU 101 allows the reading head 10 to read the document while driving the CR motor 15 and moving the carriage 11 at a speed equivalent to a reading resolution, and thus, stores the obtained image data in the image memory 104 or the data storage 116. Since the image data is obtained in the main scanning processing at a higher resolution than that in the pre-scanning processing, the carriage 11 is moved at a lower speed than that in the pre-scanning processing. In particular, in the case of color copying, three luminance values of R (red), G (green), and B (blue) colors of each pixel need to be detected, and therefore, the carriage 11 is moved more slowly.

Here, the position or layout of the existing document is checked in advance by the pre-scanning processing in the present embodiment, thus enhancing the reading efficiency by the main scanning processing. For example, no reading processing may be performed and the reading head 10 may not be used in a region that is determined to have no document even that can be read by the reading head 10. Moreover, in a region of a document that is found to have a color image, the luminance values of the R, G, and B colors of each pixel are detected. In contrast, the luminance value of any one of the R, G, and B colors of each pixel may be detected in a region of a document that is found to have a monochromatic image. At any rate, it is possible to shorten a time required for the main scanning processing or reduce the processing based on information about the document obtained by the pre-scanning processing.

Next, the CPU 101 subjects image data stored by the main scanning processing to predetermined image processing in accordance with a predetermined image processing program stored in the ROM 102. More specifically, the CPU 101 divides the image data stored per document that is checked by the pre-scanning processing, and then, subjects it to proper color conversion processing or quantization processing, thus producing print data that can be printed by the printing unit 113. For example, in terms of a document such as a photographic image, the CPU 101 color-converts the RGB image data obtained by the main scanning processing into CMYK data corresponding to color materials prepared in the printing unit 113, further subjects the CMYK data to quantization processing, thus producing CMYK data having a relatively high resolution. In contrast, in terms of a monochromatic document, the CPU 101 converts luminance data obtained by the main scanning processing into density data, further subjects the density data to quantization processing or the like, thus producing black data (i.e., K data) having a relatively low resolution.

Once the print data is produced, the CPU 101 proceeds to step S305, in which it performs print processing in accordance with the print data. More specifically, while conveying a sheet by the use of the sheet feeder/conveyor 114, the CPU 101 prints an image on the sheet in accordance with the print data by using the printing unit 113, and then, discharges it onto the discharge tray 5a. When a plurality of documents are detected during the pre-scanning processing, the print processing in step S305 may be performed with respect to each of the documents or images of the plurality of documents may be printed on a single sheet.

Upon completion of the print processing with respect to a piece of sheet, the CPU 101 proceeds to step S306, in which it is determined whether or not document data to be printed remains. If it is determined that the document data remains, the CPU 101 returns to step S302, and then, performs print processing with respect to a next document. In contrast, if it is determined that the print processing with respect to all the document data is completed, the present processing comes to an end.

Figure 5:
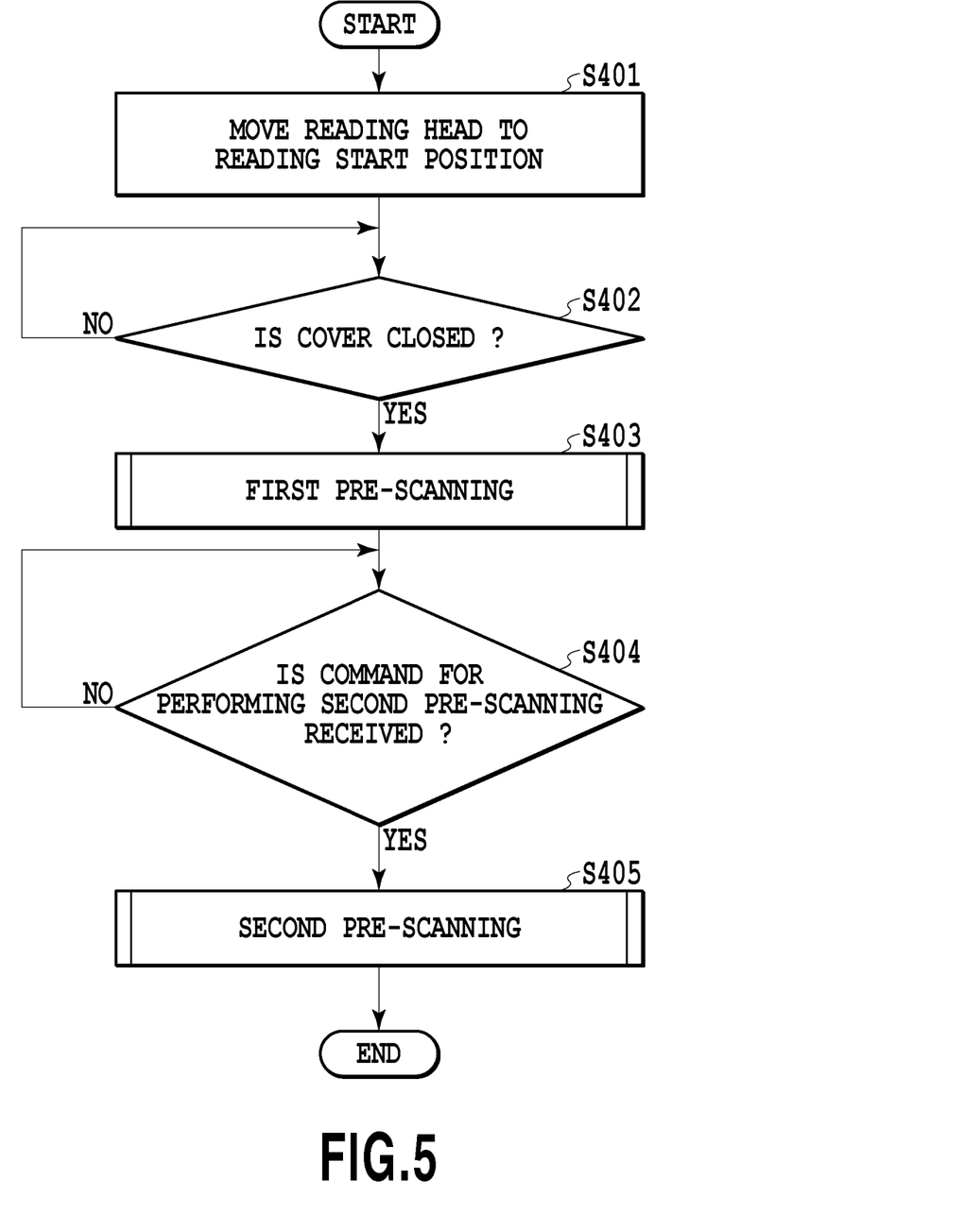
FIG. 5 is a flowchart illustrating the details of pre-scanning processing.

FIG. 5 is a flowchart illustrating the details of the pre-scanning processing in step S302. The CPU 101 performs the present processing in accordance with the program stored in the ROM 102. The pre-scanning processing in the present embodiment includes two steps: first pre-scanning for checking the number, size, and layout of documents; and second pre-scanning for checking the status of each document, for example, whether the document is monochromatic or color or it is writing or a photograph.

Figure 6A:
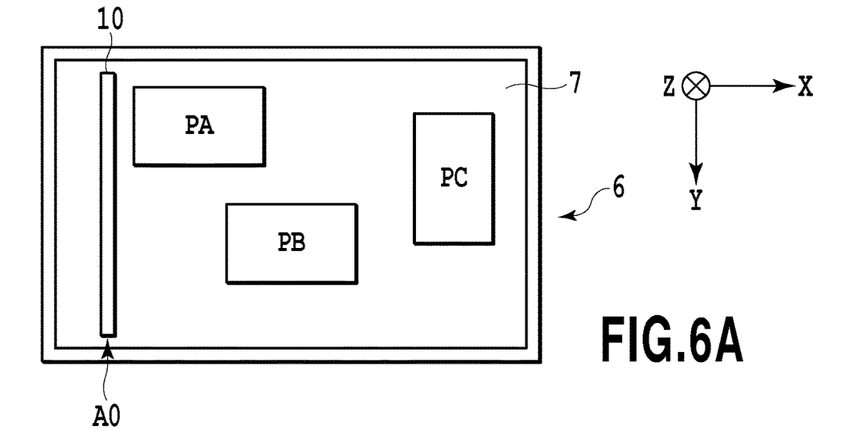
FIGS. 6A to 6C are diagrams illustrating specific examples of the pre-scanning processing.
Figure 6B:
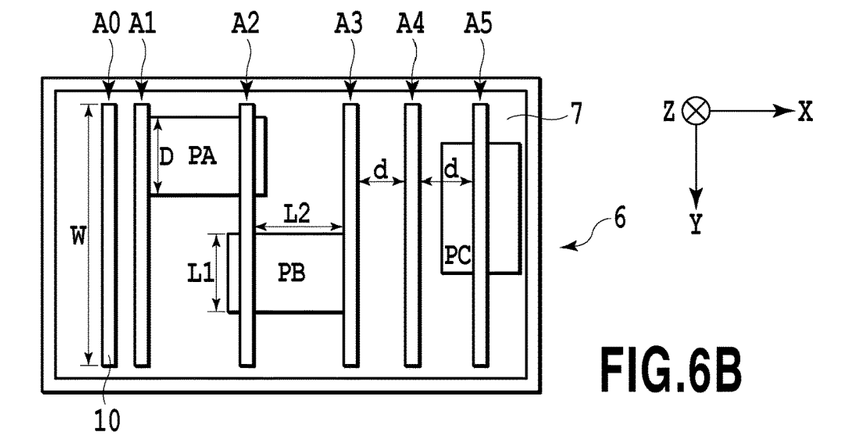
Figure 6C:
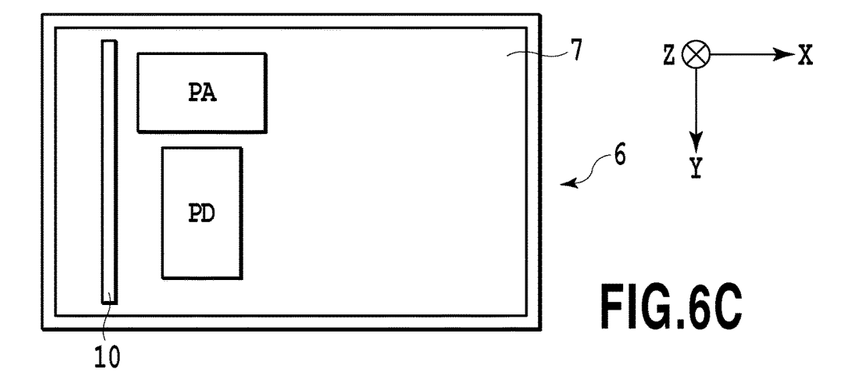

In the meantime, FIGS. 6A to 6C are diagrams illustrating specific examples of the pre-scanning processing. Here is an example in which the first pre-scanning processing is performed by moving the reading head 10 in the X direction when documents denoted by reference characters PA, PB, PC, and PD are laid out in various directions on the glass plate 7. Hereinafter, the pre-scanning processing will be explained in accordance with the flowchart of FIG. 5 with reference to FIGS. 6A to 6C. In the explanation below, a state in which a long side is arranged in parallel to the X direction is referred to as a lateral layout, and furthermore, a state in which a short side is arranged in parallel to the X direction is referred to as a vertical layout.

Upon start of the present processing, the CPU 101 first moves the reading head 10 from its home position to a reading start position (A0) and puts it on standby in step S401. FIG. 6A shows a state in which the reading head 10 stays at the reading start position (A0) in step S401.

When it is checked in step S402 that the cover 2 is closed, the CPU 101 proceeds to step S403, and then, performs the first pre-scanning. Although the details of the first pre-scanning are given later, the first pre-scanning gives information about the number, size, and layout of documents placed on the document table 6.

Moreover, when the CPU 101 checks the reception of a command for performing the second pre-scanning in step S404, the CPU 101 proceeds to step S405, and then, performs the second pre-scanning. The second pre-scanning gives information about the details of each of the documents placed on the document table 6. In this manner, the present processing comes to an end. Thereafter, the CPU 101 can efficiently perform the main scanning processing in step S303 based on the information obtained in the first pre-scanning in step S403 and the information obtained in the second pre-scanning in step S405.

Figure 7:
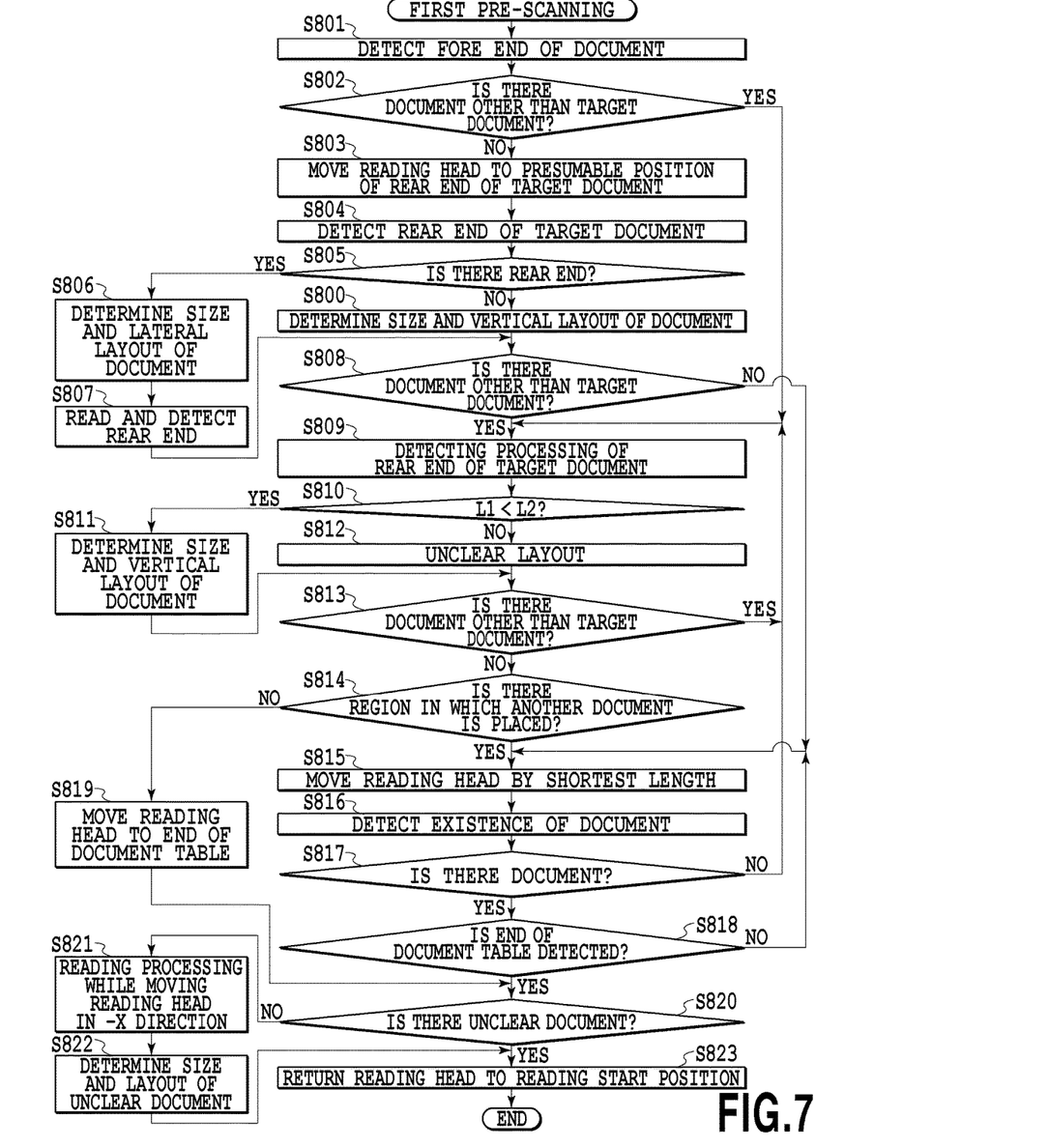
FIG. 7 is a flowchart illustrating first pre-scanning processing.

FIG. 7 is a flowchart illustrating the first pre-scanning processing that is performed in step S403. The CPU 101 also performs the present processing in accordance with the program stored in the ROM 102. Upon start of the present processing, the CPU 101 first detects the fore end of a document placed at a position nearest to an origin (A0) while moving the reading head 10 in the X direction in step S801. More specifically, the CPU 101 moves the reading head 10 in the X direction while allowing the reading head 10 to perform the reading processing, detects the document at a timing at which the document is found in at least a part of a region within the width W of a reading region, and thus, stores a width D in the Y direction.

An arrow A1 in FIG. 6B indicates a position where the reading head 10 detects the fore end of the document PA. At this stage, the CPU 101 designates the document whose fore end is detected as a target document at present. The document PA is a target document in FIG. 6B.

In step S802, the CPU 101 presumes the size of the target document based on the detected width D of the target document. In addition, the CPU 101 determines whether or not there is a possibility that the other document PD exists within a range in the X direction of the target document PA, as shown in FIG. 6C.

Figure 8:
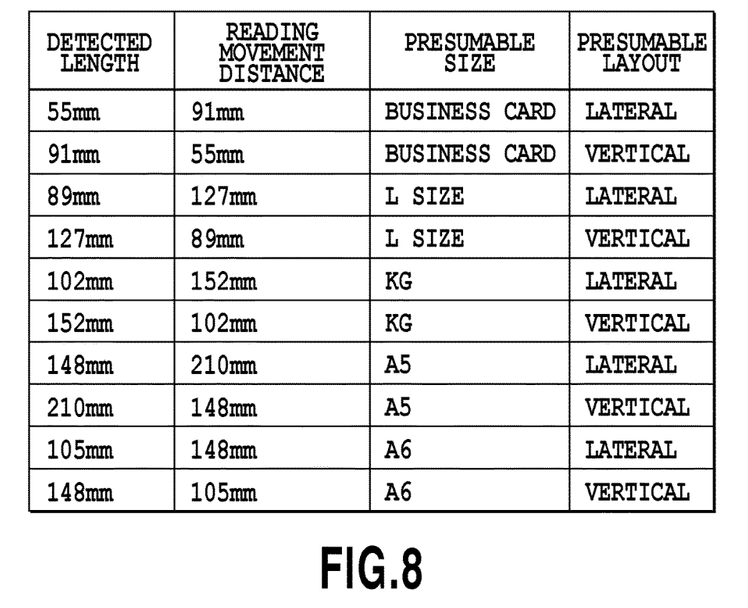
FIG. 8 is a table illustrating the relationship between the size and layout of a document that can be read by the image reading apparatus.

FIG. 8 is a table illustrating the relationship between the size and layout of a document that can be read in the image reading apparatus 1 in the present embodiment. In the present embodiment, such information is designed to be stored in advance in the ROM 102. When, for example, the width D of the target document detected in step S801 is 148 mm, the target document is determined to have an A5 size in a lateral layout or an A6 size in a vertical layout with reference to FIG. 8. In either case, there is a possibility that the other document PD exists within the range of the target document PA in the X direction, as shown in FIG. 6C. Alternatively, when the width D of the target document detected in step S801 is, for example, 91 mm, it is determined with reference to FIG. 8 that the target document has the size of a business card in a vertical layout. In this case, there is no possibility that the other document PD exists within the range of the target document PA in the X direction, unlike the example shown in FIG. 6C.

In this manner, it is determined in step S802 whether or not there is a possibility that the other document PD exists within the range in the X direction occupied by the target document PA based on the position and width of the detected target document in the Y direction and the information illustrated in FIG. 8. If it is determined that there is a possibility that the other document PD exists, as shown in FIG. 6C, the CPU 101 jumps to step S809. Also if the fore ends of a plurality of documents are detected in step S801, the CPU 101 jumps to step S809. In contrast, if it is determined that there is no possibility that the other document PD exists, the CPU 101 proceeds to step S803.

In step S803, the CPU 101 regards the position of a rear end having a longer size out of the presumable positions of a plurality of rear ends of the target document PA as a next detection position, and then, moves the reading head 10. When the width D of the target document is, for example, 91 mm, the target document presumably has an A5 size in a lateral layout or an A6 size in a vertical layout with reference to FIG. 8 again. In the case of the A5 size in a lateral layout, the rear end of the target document is positioned in the X direction by 210 mm from the position (A1) of the fore end. In the case of the A6 size in a vertical layout, the rear end of the target document is positioned in the X direction by 105 mm from the position (A1) of the fore end. In this case, the CPU 101 regards a position apart by a longer distance (210 mm) as the detection position, and thus, moves the reading head 10 in the X direction. An arrow A2 in FIG. 6B indicates a position at this stage after the reading head 10 is moved. Here, during the movement from the position A1 to the position A2, no detecting processing by the reading head 10 is performed. Therefore, the movement speed of the carriage 11 in step S804 can be set higher than that when the position of the fore end is detected in step S801.

In subsequent step S804, the CPU 101 allows the reading head 10 to perform the detecting processing at the position A2. In steps S805 to S807, the CPU 101 determines the size and layout of the target document based on the detection result. In a case where, for example, the document having the width D is detected as a result of the detection at the position A2 by the reading head 10, the CPU 101 proceeds to step S806, and then, it determines that the target document is placed in a lateral layout. Moreover, the CPU 101 determines the size of the document corresponding to the width D and the "lateral layout" of the document in step S806.

In other words, during the movement in step S803, the reading head 10 is moved by a predetermined distance in the X direction to the detection position corresponding to the rear end of the document having the width D and being placed in a lateral layout. In a case where the document was placed in a vertical layout, the target document could not be detected at that detection position. In view of this, if the target document is detected in step S804, it can be determined that the target document is placed in a lateral layout. As described above, when the width D of the target document is 91 mm, the size and layout of the target document are determined as "A5 in a lateral layout" in step S806.

The CPU 101 moves the reading head 10 in the X direction while allowing the reading head 10 to perform the reading processing until the rear end of the target document is securely detected. Adding step S807 enables the document size to be determined more accurately than only step S805.

In contrast, when a document having the width D is not detected, the CPU 101 proceeds to step S800, and thus, determines that the target document is placed in a vertical layout. Moreover, in step S800, the size of the document having the width D in a "vertical layout" is determined. In other words, the reading head 10 is moved to the detection position corresponding to the rear end of the document having the width D in a lateral layout by a predetermined distance in the X direction during the movement in step S803. When the document is placed in a lateral layout, the rear end of the target document can be detected at the detection position. In view of this, if no target document is detected in step S804, it can be determined that the target document is placed in a vertical layout. In the above-described manner, when the width D of the target document is 91 mm, the size and layout of the target document are determined as "A6 in a vertical layout" in step S800.

Here, the target document PA exists at the position A2 in FIG. 6B, and therefore, the CPU 101 determines that the target document has an A5 size in a lateral layout. Incidentally, if the width D of the fore end of the document detected in step S801 does not correspond to any manageable document size, the CPU 101 proceeds to the processing below while the size and layout of the target document remain unclear.

Next, the CPU 101 determines in step S808 whether or not a document other than the target document is detected at the position A2. As shown in FIG. 6B, if the document PB other than the target document PA is detected at the position A2, the CPU 101 proceeds to step S809. And then, the CPU 101 changes target document from PA to PB. In contrast, if no document other than the target document PA is detected at the position A2, the CPU 101 jumps to step S814.

In step S809, the CPU 101 detects the position of the rear end of the target document at the current stage. That is to say, the CPU 101 moves the reading head 10 in the X direction until the rear end of the target document is detected while allowing the reading head 10 to perform the reading processing. An arrow A3 in FIG. 6B indicates the position of the reading head 10 when the rear end of the target document is detected. In FIG. 6B, the position of the fore end of the document PB, which is not detected before the reading head 10 is located at the position A2, is not definitely determined. Therefore, the rear end of the document PB cannot be presumed, unlike the document PA. As a consequence, the rear end is detected in step S809 while the reading head 10 is moved during the reading processing.

At this time, if a document other than the target document is further detected, information about the width of the document in the Y direction and the position of the end of the document is obtained. In step S802 already described, also if it is determined that there is a possibility that the document other than the first target document PA exists at the position in the Y direction of the target document PA, the CPU 101 jumps to step S809, and then, obtains these pieces of information about the documents in step S809.

In step S810, it is determined whether or not a length L2 from the position A2 of the target document detected in step S808 to the position A3 of the rear end detected in step S809 is greater than a length L1 of the target document PB in the Y direction. If L1<L2, as shown in FIG. 6B, the CPU 101 proceeds to step S811, and then, determines that the target document PB is in a lateral layout. In step S811, the size of the target document PB is determined as well based on the length L1 of the target document PB in the Y direction and the "lateral layout" of the document and with reference to the table illustrated in FIG. 8. In contrast, if L1≥L2, the CPU 101 proceeds to step S812, and then, determines that the layout of the target document PB is unclear at the current stage. When it is determined that L1≥L2, there is a possibility that a document having a long side L1 is vertically laid, and furthermore, there is a possibility that a document having a long side extending between the position A2 and the position A1 is laterally laid. As a consequence, the layout of the target document cannot be definitely determined.

In step S813, the CPU 101 determines whether or not another document is detected during the detection of the rear end of the target document in step S809. If the result is affirmative, the target document is changed to the newly detected document, and then, the CPU 101 returns to step S809. Hereafter, in a case where a plurality of documents are laid out while overlapping each other in the X direction, like the documents PA and PB shown in FIG. 6B, the size and set layout of each of the documents are determined while changing the target document by repeating the processing in steps S808 to S813. In contrast, in a case where it is determined in step S813 that no other document is detected, the CPU 101 proceeds to step S814.

In step S814, the CPU 101 determines based on the current position of the reading head 10 on the document table 6 whether or not there is a possibility that a further document exists in a +X direction. A description will be specifically given below with reference to FIG. 8. In the case where, for example, a distance from the current position to the end of the document table 6 in the +X direction is less than 55 mm, it can be determined that no documents having any sizes are placed. In this case, the CPU 101 proceeds to step S819, and then, moves the reading head 10 to the end of the document table 6 in the +X direction without any detecting processing. In contrast, when a distance from the current position to the end of the document table 6 in the +X direction is 55 mm or greater, it can be determined that there is a possibility that a document having at least the size of a business card is placed. In this case, the CPU 101 proceeds to step S815.

In step S815, the CPU 101 moves the reading head in the +X direction by a distance equivalent to the shortest side out of the manageable document sizes, and furthermore, allows the reading head 10 to perform the detecting processing at the position in step S816, and then, determines the existence of the document in step S817. In FIG. 6B, the CPU 101 determines that there is a possibility that a still further document exists in the +X direction at the position A3 (step S814), and thus, moves the reading head 10 by a distance d of 55 mm in the +X direction so as to allow the reading head 10 to perform the detecting processing at the position A4 (step S817).

If it is determined in step S817 that the document is detected, the document is regarded as a new target document. After that, the CPU 101 returns to step S809 in order to detect the size and layout of the new target document. In contrast, if it is determined in step S817 that no document is detected, the processing in steps S815 to S817, that is, the movement by the distance d and the detection of the document are repeated until the end of the document table 6 is checked in step S818. FIG. 6B shows a state in which a further document PC is detected in step S817 when the reading head 10 is located at a position A5 after being moved twice by the distance d. The new document PC is designated as a target document in step S817. The CPU 101 returns to step S809 again, and then, obtains its size and layout.

When the end of the document table 6 is checked in step S818, the CPU 101 proceeds to step S820, and determines whether or not there is a document whose size or layout is unclear at the current stage. When the processing in step S812 is performed, it is determined in step S820 that there is a document whose size or layout is unclear. For example, the layout of the document PB shown in FIG. 6B remains unclear. Also in terms of the document PC, although the detecting processing is performed in a region beyond the position A5 in the +X direction, the detecting processing is not performed in a region before the position A5 in a −X direction, and therefore, the size and layout remain unclear. In this case, the CPU 101 proceeds to step S821.

In step S821, the CPU 101 performs the reading processing in a region that has not yet been subjected to the reading processing by the reading head 10 while moving the reading head 10 in the −X direction. In this manner, the CPU 101 can determine the size and layout of the document whose size and layout were unclear (step S822).

In the above-described manner, after the sizes and layouts of all of the documents placed on the document table 6 are determined, the CPU 101 proceeds to step S823, and then, returns the reading head 10 to the reading start position A0. In this manner, the first pre-scanning processing comes to an end.

According to the present embodiment described above, prior to the actual reading processing of the document, the first pre-scanning is performed in order to determine the number of documents and their sizes and layouts, and furthermore, the second pre-scanning is performed in order to grasp the status of each of the documents. When the other document is located at the position at which the position of the end of the target document is checked during the first pre-scanning, the positions of the ends of the plurality of documents are detected in sequence while the other document is regarded as a new target document.

At this time, the reading head performs the reading processing only in the minimum region required for determining the size and layout of the document whereas it is just moved without performing the reading processing in the other regions. As a consequence, since the reading head 10 performs the reading processing only in the region in which the document exists during the subsequent second pre-scanning or the actual image reading processing, the efficiency of the processing is enhanced. Consequently, even if a plurality of documents are laid out on the document table, each of the documents can be subjected to the reading processing without taking a processing time or exerting a processing load more than necessary.

Second Embodiment

The reading apparatus 1 described with reference to FIGS. 1A to 3 is used also in the present embodiment, like the first embodiment. A copying operation is performed in accordance with the flowchart illustrated in FIG. 4, and furthermore, pre-scanning processing is performed in accordance with the flowchart illustrated in FIG. 5.

In the first embodiment, when the fore end of the document is first detected in step S801, the subsequent processing depends upon whether or not there is a possibility that the other document exists in the region occupied by the document in the X direction (step S802). Then, only in the case where there is no possibility of the existence of the other document the reading head is moved to the position at which the rear end of the target document is presumed to be located (step S803). In contrast, in the present embodiment, the reading head 10 is moved by a distance (i.e., d in step S815) equivalent to the smallest document size that can be handled by the image reading apparatus 1 irrespective of the existence of the other document.

Figure 9:
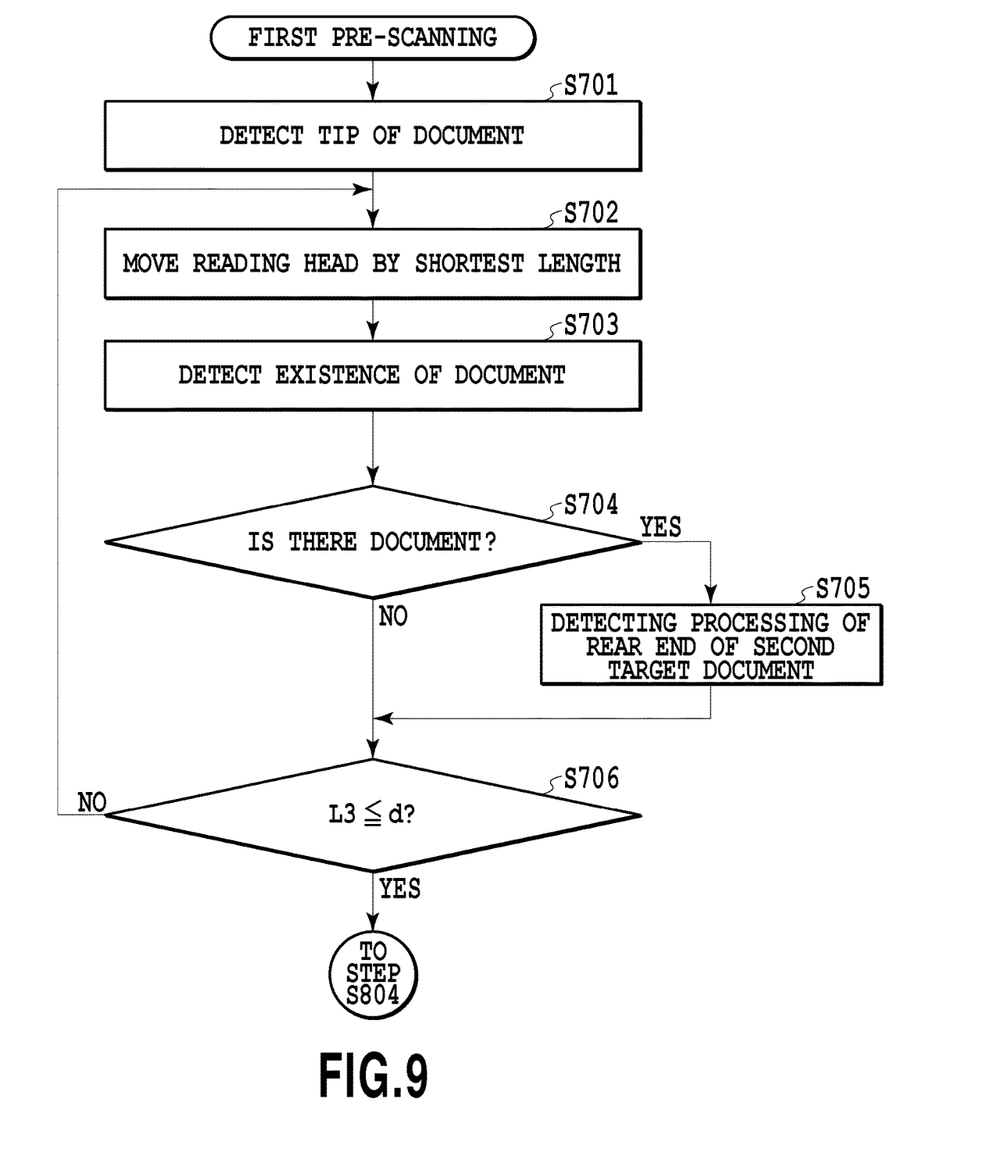
FIG. 9 is a flowchart illustrating another example of the first pre-scanning processing.

FIG. 9 is a flowchart illustrating first pre-scanning processing to be performed by a CPU 101 in the present embodiment. The fore end of a document located at a position nearest an origin (A0) is detected in step S701, in the same way as step S801. In step S702, the CPU 101 moves a reading head 10 by a distance (i.e., d=55 mm) equivalent to the smallest document size that can be handled, as shown in FIG. 8. During this movement, no detecting processing is performed by the reading head 10.

Moreover, the CPU 101 proceeds to step S703, and then, allows the reading head 10 to perform detecting processing. It is determined in step S704 whether or not a document other than a target document exists at the position. If it is determined that there is a document other than a target document, the document is regarded as a second target document and the previous target document is regarded as a first target document, and then, the CPU 101 proceeds to step S705. In step S705, the CPU 101 moves the reading head 10 in an X direction while performing the reading processing until the rear end of the second target document is detected. In contrast, if it is determined in step S704 that there is no document other than a target document, the CPU 101 just proceeds to step S706.

In step S706, the CPU 101 determines whether or not a distance L3 from the position of the rear end of the first target document from the current position of the reading head 10 is greater than the distance d (i.e., d=55 mm) equivalent to the smallest document size. In a case where L3>d, the CPU 101 returns to step S702, and then, repeats the movement by the distance d and the reading processing. In contrast, in a case where L3≤d, processing for detecting the rear end of the first target document is performed. This processing corresponds to that in step S804 in FIG. 7. The processing onwards is identical to that in the first embodiment illustrated in FIG. 7.

According to the present embodiment described above, after the fore end of the document is first detected, the existence of the document and the number of documents are detected repeatedly at an interval equivalent to the smallest document size. As a consequence, a document having a relatively small size arranged in parallel to a target document in the X direction can be detected as well during scanning in a +X direction.

Although in the above-described embodiments, the first pre-scanning and the second pre-scanning are independent of each other, the present invention is not limited to the above-described embodiments. The above-described first pre-scanning may be performed as pre-scanning to be performed immediately before main scanning. Here, the main scanning does not always need to be performed followed after the pre-scanning according to the present invention. For example, a user may be able to adjust the layout of documents placed on the document table according to the detection result of the first pre-scanning.

Additionally, although the description has been given above of the pre-scanning for the reading operation in performing the copying operation, it is understood that the present invention should not be limited to this. The present invention is applicable even in the case where the image reading apparatus functions simply as a scanner without any printing operation or in the case where read image data is transferred via facsimile communications.

Although it is assumed above that only the document sizes illustrated in FIG. 8 are handled, the document sizes are not limited to those listed in FIG. 8. The more the number of document sizes that can be handled becomes, the more the number of layout ways becomes. Furthermore, the number of layout ways changes according to the size or shape of the document table. At any rate, repeating the acquirement of the position of the rear end of each of the documents and the recognition of the existence of the other documents under presumable conditions enables the accurate determination of the size and layout of one or more documents placed on the document table.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2016-225342, filed Nov. 18, 2016, which is hereby incorporated by reference wherein in its entirety.

What is claimed is:

1. An image reading method executed by an image reading apparatus which moves a reading head, in which a plurality of reading sensors are arranged in a first direction, along a document table in a second direction crossing the first direction, so as to read a plurality of documents placed on the document table, the image reading method comprising:

a first moving step, by at least one processor of the image reading apparatus, for causing the image reading apparatus to move the reading head in the second direction to a detection position by a predetermined distance from a position, at which a first document is detected, in a state in which the reading head does not perform predetermined reading processing;

a first determining step, by the at least one processor, for determining the size and layout of the first document based on the result, when the reading head is at the detection position, of the predetermined reading processing by reading sensors among the plurality of reading sensors arranged at positions corresponding to the first document in the first direction; and a second determining step, by the at least one processor, for determining whether or not a second document other than the first document exists at the detection position in the second direction and a position apart from the first document in the first direction, based on the result, when the reading head is at the detection position, of the predetermined reading processing by reading sensors among the plurality of reading sensors arranged at positions corresponding to the second document in the first direction, and determining the size and layout of the second document based on the result in a case where it is determined that the second document exists.

2. The image reading method according to claim 1, wherein the predetermined distance corresponds to a distance from the position at which the first document is detected to a position that is estimated the rear end of the first document exists on.

3. The image reading method according to claim 2, wherein the predetermined distance is the greatest distance of distances from the position, at which the first document is detected, to a plurality of positions, that are estimated the rear end of the first document exists on, and it is determined in the first determining step that the first document is laid out such that its long side is parallel to the second direction in a case where the first document is detected by the reading head at the detection position.

4. The image reading method according to claim 1, further comprising:

a second moving step, by the at least one processor, for moving the reading head in the second direction while making the reading head to perform the predetermined reading processing until the rear end of the second document is detected in a case where it is determined in the second determining step that the second document exists at the detection position.

5. The image reading method according to claim 1, wherein in the second determining step, in a case where it is determined that the second document exists at the detection position, the size and layout of the second document are determined by comparing a distance from the detection position to a position, at which the rear end of the second document is detected, with a size in the first direction of the second document.

6. The image reading method according to claim 1, wherein the position, at which the first document is detected, is the position of the fore end of the first document that is first detected by moving the reading head in the second direction while making the reading head to perform the predetermined reading processing.

7. The image reading method according to claim 1, further comprising: a step by the at least one processor, in a case where it is determined that there is no second document at the detection position in the second determining step and there is a region in which another document can be placed in downstream side of the detection position on the document table, for causing the image reading apparatus to move the reading head in a state in which the reading head does not perform the predetermined reading processing by a distance equivalent to the minimum size that is estimated of a document, performing the predetermined reading processing after the movement, and determining based on the result of the predetermined reading processing whether or not a second document other than the first document exists.

8. The image reading method according to claim 1, further comprising:

a reading step for causing the image reading apparatus to read an image of each of the plurality of documents while making the reading head to perform the predetermined reading processing, based on the determination result after the size and layout of each of the plurality of documents are determined.

9. An image reading apparatus for moving a reading head, in which a plurality of reading sensors are arranged in a first direction, along a document table in a second direction crossing the first direction, so as to read a plurality of documents placed on the document table, the image reading apparatus comprising at least one processor:
    wherein the at least one processor functions as:
    a first moving unit configured to move the reading head in the second direction to a detection position by a predetermined distance from a position, at which a first document is detected, in a state in which the reading head does not perform predetermined reading processing;
    a first determining unit configured to determine the size and layout of the first document based on the result, when the reading head at the detection position, of the predetermined reading processing by reading sensors among the plurality of reading sensors arranged at positions corresponding to the first document in the first direction; and
    a second determining unit configured to determine whether or not a second document other than the first document exists at the detection position in the second direction and a position apart from the first document in the first direction, based on the result, when the reading head is at the detection position, of the predetermined reading processing by reading sensors among the plurality of reading sensors arranged at positions corresponding to the second document in the first direction, and determine the size and layout of the second document based on the result in a case where it is determined that the second document exists.

10. The image reading apparatus according to claim 9, wherein the predetermined distance corresponds to a distance from the position at which the first document is detected to a position that is estimated the rear end of the first document presumably exists on.

11. The image reading apparatus according to claim 10, wherein the predetermined distance is the greatest distance of distances from the position, at which the first document is detected, to a plurality of positions, that are estimated the rear end of the first document exists on, and
    the first determining unit determines that the first document is laid out such that its long side is parallel to the second direction in a case where the first document is detected by the reading head at the detection position.

12. The image reading apparatus according to claim 9, further comprising:
    a second moving unit configured to move the reading head in the second direction while making the reading head to perform the predetermined reading processing until the rear end of the second document is detected in a case where the second determining unit determines that the second document exists at the detection position.

13. The image reading apparatus according to claim 9, wherein, in a case where the second determining unit determines that the second document exists at the detection position, the second determining unit compares a distance from the detection position to a position, at which the rear end of the second document is detected, with a size in the first direction of the second document to determine the size and layout of the second document.

14. The image reading apparatus according to claim 9, wherein the position, at which the first document is detected, is the position of the fore end of the first document that is first detected by moving the reading head in the second direction while making the reading head to perform the predetermined reading processing.

15. The image reading apparatus according to claim 9, further comprising: a unit configured to,
    in a case where the second determining unit determines that there is no second document at the detection position and there is a region in which another document can be placed in downstream side of the detection position on the document table,
    move the reading head in a state in which the reading head does not perform the predetermined reading processing by a distance equivalent to the minimum size that is estimated of a document, to perform the predetermined reading processing after the movement, and to determine based on the result of the predetermined reading processing whether or not a second document other than the first document exists.

16. The image reading apparatus according to claim 9, further comprising:
    a reading unit configured to read an image of each of the plurality of documents while making the reading head to perform the predetermined reading processing based on the determination result after the size and layout of each of the plurality of documents are determined.

17. A non-transitory computer-readable storage medium that allows one or more processors to perform an image reading method executed by an image reading apparatus which moves a reading head in which a plurality of reading sensors are arranged in a first direction, along a document table in a second direction crossing the first direction, so as to read a plurality of documents placed on the document table, the image reading method comprising:
    a first step, by at least one processor of the image reading apparatus, for causing the image reading apparatus to move the reading head in the second direction to a detection position by a predetermined distance from a position, at which a first document is detected, in a state in which the reading head does not perform predetermined reading processing;
    a first determining step, by the at least one processor, for determining the size and layout of the first document based on the result, when the reading head is at the detection position, of the predetermined reading processing by reading sensors among the plurality of reading sensors arranged at positions corresponding to the first document in the first direction; and
    a second determining step, by the at least one processor, for determining whether or not a second document other than the first document exists at the detection position in the second direction and a position apart from the first document in the first direction, based on the result, when the reading head is at the detection position, of the predetermined reading processing by reading sensors among the plurality of reading sensors arranged at positions corresponding to the second document in the first direction, and determining the size and layout of the second document based on the result in a case where it is determined that the second document exists.

* * * * *